US007870411B2

(12) United States Patent
Fraser et al.

(10) Patent No.: US 7,870,411 B2
(45) Date of Patent: Jan. 11, 2011

(54) TRACKING CURRENT TIME ON MULTIPROCESSOR HOSTS AND VIRTUAL MACHINES

(75) Inventors: Keir Fraser, Cambridge (GB); Ian Alexander Pratt, Cambridge (GB)

(73) Assignee: XenSource, Inc., Palo Alto, CA (US)

( * ) Notice: Subject to any disclaimer, the term of this patent is extended or adjusted under 35 U.S.C. 154(b) by 556 days.

(21) Appl. No.: 11/879,338

(22) Filed: Jul. 17, 2007

(65) Prior Publication Data

US 2008/0126820 A1 May 29, 2008

Related U.S. Application Data

(60) Provisional application No. 60/831,279, filed on Jul. 17, 2006.

(51) Int. Cl.
G06F 1/12 (2006.01)
G06F 13/42 (2006.01)
G06F 15/16 (2006.01)

(52) U.S. Cl. .................. 713/375; 713/400; 709/248
(58) Field of Classification Search ................ 713/375
See application file for complete search history.

(56) References Cited

U.S. PATENT DOCUMENTS

| 5,636,373 | A * | 6/1997 | Glendening et al. ......... 713/400 |
| 6,446,254 | B1 | 9/2002 | Chapman et al. |
| 6,785,886 | B1 | 8/2004 | Lim et al. |
| 7,023,816 | B2 * | 4/2006 | Couillard .................... 370/324 |
| 7,058,838 | B2 * | 6/2006 | Xu .............................. 713/400 |
| 7,084,810 | B2 * | 8/2006 | Kitatani ................. 342/357.12 |
| 7,310,721 | B2 | 12/2007 | Cohen |
| 7,487,229 | B2 * | 2/2009 | Ohly ........................... 709/219 |
| 7,512,826 | B2 * | 3/2009 | Armstrong et al. .......... 713/375 |
| 2002/0078243 | A1 * | 6/2002 | Rich et al. ................... 709/248 |
| 2004/0003123 | A1 * | 1/2004 | Kwon ........................... 709/248 |
| 2004/0128555 | A1 * | 7/2004 | Saitoh et al. ................ 713/201 |
| 2005/0097298 | A1 | 5/2005 | Cohen |
| 2005/0160151 | A1 | 7/2005 | Rawson |
| 2006/0047974 | A1 | 3/2006 | Alpern et al. |
| 2006/0095689 | A1 | 5/2006 | Peinado et al. |
| 2006/0117169 | A1 | 6/2006 | Peinado et al. |
| 2006/0190752 | A1 * | 8/2006 | Lee ............................. 713/323 |
| 2007/0006226 | A1 | 1/2007 | Hendel |
| 2007/0179955 | A1 | 8/2007 | Croft et al. |
| 2008/0244301 | A1 * | 10/2008 | Shih ............................ 713/500 |

OTHER PUBLICATIONS

International Search Report for PCT/US07/16205 (Jun. 19, 2008), 1 page.

(Continued)

*Primary Examiner*—Suresh K Suryawanshi
(74) *Attorney, Agent, or Firm*—Foley & Lardner LLP; John D. Lanza

(57) ABSTRACT

An operating system in a virtual environment can obtain the current time of the processor that the OS is utilizing through a method for synchronizing timers on multiple processors with a standard reference time, such as the Coordinated Universal Time (UTC). A hypervisor controlling the processors obtains a number of synchronization values that, together with a local timer counter value, are utilized by the guest operating system to determine the physical processor time.

19 Claims, 7 Drawing Sheets

OTHER PUBLICATIONS

Written Opinion for PCT/US07/16205 (Jun. 19, 2008), 3 pages.
International Search Report for PCT/US07/16205 (Jun. 2008).
Written Opinion for PCT/US07/16205 (Jun. 2008).
International Search Report for PCT/US07/14309 (Aug. 2008).
Written Opinion for PCT/US07/14309 (Aug. 2008).
Office Action for U.S. Appl. No. 11/487945 (Jun. 20, 2008).

* cited by examiner

TRACKING CURRENT TIME ON MULTIPROCESSOR HOSTS AND VIRTUAL MACHINES

CROSS-REFERENCE TO RELATED APPLICATION

This application is based upon and claims benefit of copending and co-owned U.S. Provisional Patent Application Ser. No. 60/831,279, filed with the U.S. Patent and Trademark Office on Jul. 17, 2006, by the inventors herein and titled "Tracking Current Time on Multiprocessor Hosts and Virtual Machines" the specification of which is herein incorporated by reference in its entirety.

FIELD OF THE INVENTION

The present invention generally relates to the field of virtual computing and particularly to synchronizing processors in a multiprocessor environment to a shared time value.

BACKGROUND OF THE INVENTION

A fundamental requirement of most computer systems is to accurately report the current time. This service is used in a number of contexts, but most commonly to read the time of day (wall-clock time) or to measure the time between two events. A timer (oscillator plus counter) on the CPU (Central Processing Unit or Processor) is commonly calibrated to an standard reference time, such an external time-of-day or UTC (Universal Time Constant), by taking a counter timestamp ($l_s$) at a known standard reference time, e.g., UTC time, ($u_s$), and calculating the relative frequency of the reference time, UTC, and the CPU timer (du/dl). The current time can then be calculated by reading the local CPU timer value:

$$u = u_s + (l - l_s) * du/dl$$

A multiprocessor system is more complicated because each CPU has an independent timer, wherein each timer may potentially have an unsynchronized time value and frequency. The single processor scheme does not trivially extend to this case because the established method for synchronizing with UTC, NTP (Network Time Protocol), is implemented with a user-space daemon that will inherently synchronize only the timer of the CPU on which it is running.

A common solution, employed in Linux® (Linus Torvalds, Portland, Oreg., U.S.), is to synchronize with a shared timer that is accessible by all CPUs. This timer is usually implemented in the platform chipset. This strategy has two disadvantages in the context of virtualization:

1. Reading a platform chipset register is usually much slower than reading a local CPU register. This will be especially noticeable if time is read frequently.

2. Although all systems that use a particular type of CPU will necessarily share the same CPU-local timer implementation and interface, platform timers are not so homogeneous. For example, on Intel x86 systems there may be one or more of legacy PIT (Programmable Interval Timer), HPET (High Precision Event Timer), or a vendor-specific timer (e.g., IBM Cyclone). This platform-specific information may be propagated to the virtual machine (VM) which adds complexity to the hypervisor and to the guest OS (Operating System), and binds the virtual machine more tightly to the physical hardware.

SUMMARY OF THE INVENTION

Accordingly, the present invention provides a method for synchronizing processor timers of a multiprocessor system for use by an operating system. The synchronization of the processor timers is to a standard reference time. In a contemplated preferred embodiment the current invention determines various synchronization values that allow for the determination of synchronized time that may be utilized by a platform timer synchronized to an external time source, such as UTC. This synchronization may be much simpler than the algorithms employed by NTP because the timers may be consulted accurately and with insignificant latency due to the machine-local oscillators that have a stable frequency (within a couple of parts per million).

A further contemplated embodiment of the present invention allows an operating system to maintain an accurate time record when reassigned to a different local processor within the system.

In another contemplated embodiment, a synchronized computer system comprises a plurality of local processors, each containing a time counter, communicatively connected to at least one of a hypervisor; a platform timer; a plurality of virtual processors, each assigned to one of the physical processors; or a guest operating system. The system further comprises a synchronization set of instructions. The system allows the guest operating system to maintain a current time. The system further allows the guest operating system to update its current time when it is reassigned to a different physical processor within the system.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

The invention summarized above may be better understood by referring to the following description, which should be read in conjunction with the accompanying drawings. This description of an embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1A:
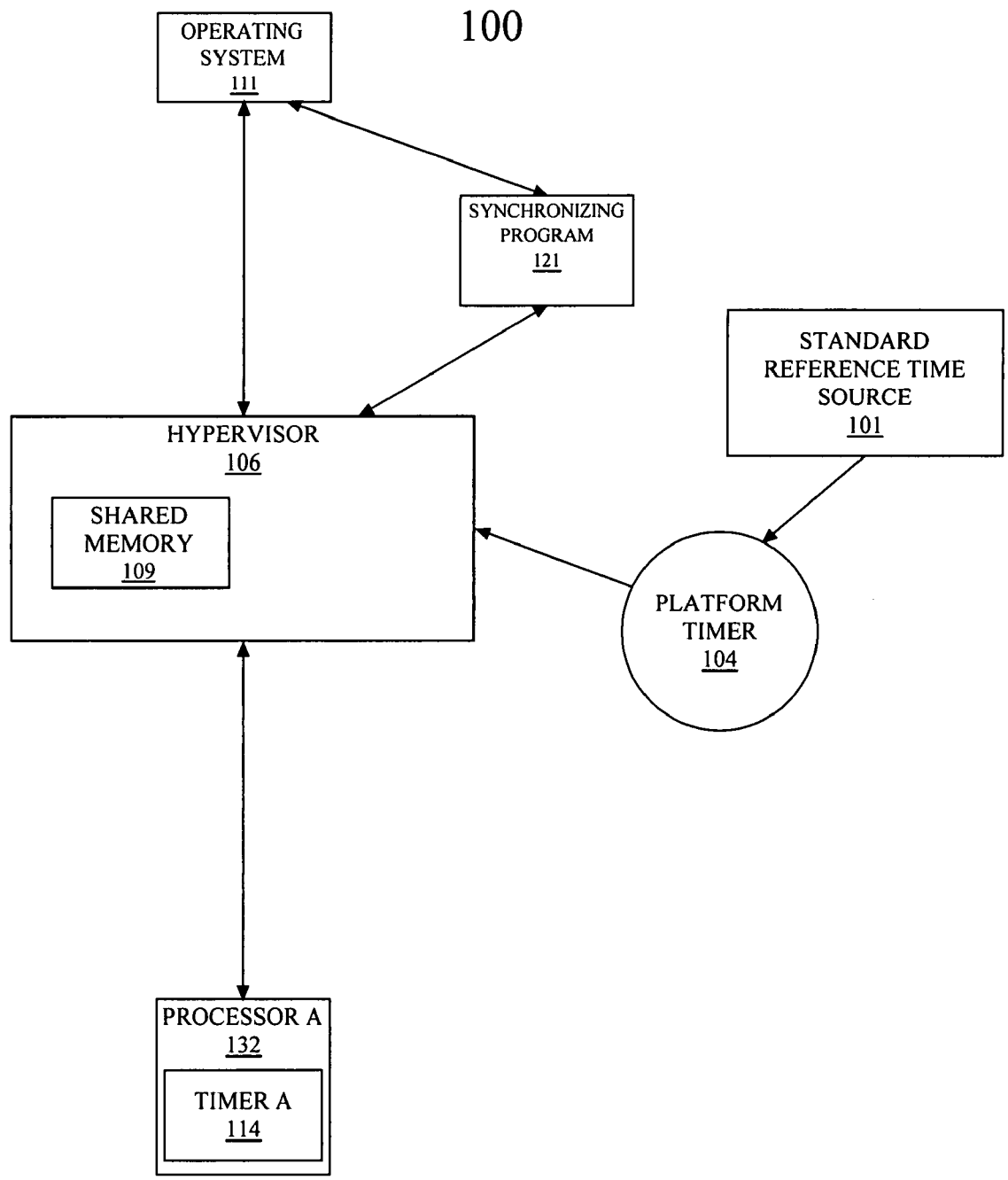
FIG. 1A is an illustration of an exemplary computing system with a single processor within which a synchronizing program may be implemented.

In a preferred embodiment, as shown in FIG. 1, a synchronization system 100 is presented including several components. The components of the system 100 include a processor (CPU) 132 having a processor timer ("local timer") 114, a hypervisor 106, and a platform timer 104. The hypervisor 106 is communicatively coupled with the processor 132 over a communication pathway 140 ("bus") and the platform timer 104 over a communication pathway 150. It is contemplated that the communication between the processor 132 and platform timer 104 may be over a separate designated communication pathway from that of the hypervisor 106 and platform timer 104. The communication pathways allow each of the components to interact with one another through the sharing of information and processing of that information. In the current embodiment, system 100 further includes a guest operating system (GOS) 111 which is communicatively coupled with the hypervisor 106 over a communication pathway 160. As shown, communication between the hypervisor 106 and the GOS 111 may be accomplished through utilization of a shared memory 109. The use of shared memory 109 allows the hypervisor 106 and GOS 111 to communicate safely and correctly without requiring synchronous traps, either when reading the current time or updating relative frequency values and which allows synchronization values to be stored and retrieved, as will be described below. It is contemplated that other locations within the computing system may provide a similar functionality as that provided by shared memory 109 in FIG. 1A. Communication pathway 160 also allows GOS 111 to communicate with CPU 132. Alternatively, the GOS 111 may be in direct communication with CPU 132 over a separate designated communication pathway.

In a preferred embodiment, a standard reference time source (SRTS) 101, capable of providing a standard reference time value, such as a Universal Time Constant (UTC) value, is communicative coupled with platform timer 104 over communication pathway 170. In alternative embodiments, SRTS 101 may be communicatively coupled with other components of the system 100 using various communication pathways which may be separately designated or bussed through one or more other components of system 100. In the current embodiment, system 100 further includes a synchronizing program (SP) 121 in the form of a computer readable set of instructions for synchronizing the local timer 114 with an extrapolated reference time from the platform timer 104. As shown, the SP 121 may be implemented upon/within the GOS 111 and hypervisor 106 simultaneously for the performance of the computer (CPU) executable commands contained within the instruction set. The implementation of the synchronizing program 121 and GOS 111 and hypervisor 106 may be accomplished through a download of the entire SP 121 instruction set into one of these components or through a partial download of the executable commands to and between both the GOS 111 and hypervisor 106. As contemplated with standard computing systems, such a computer executable set of instructions as that presented by SP 121 may alternatively be downloaded into various other locations within the computing system that are accessible by GOS 111 and/or hypervisor 106 and/or other components of the computing system.

Physical processor, "CPU", 132 is capable of processing data in accordance with the parameters of various computer executable commands that may be provided in various different mediums or stored in various locations with the computing system as may be contemplated by those skilled in the art. In a preferred embodiment, CPU 132 includes local timer 114 which is an oscillator and a counter. The oscillator cycles through ("ticks") a determined movement, known as an oscillation cycle, providing a known/knowable frequency for that cycle. The counter, from monitoring the number of times the oscillator ticks, is able to provide a counter value or local timer counter record which is a time record based on the frequency of the ticks. Those skilled in the art recognize that various different processors/CPUs having various different local timer mechanisms may be employed for providing the counter value referred to herein without departing from the scope and spirit of the present invention.

Figure 1B:
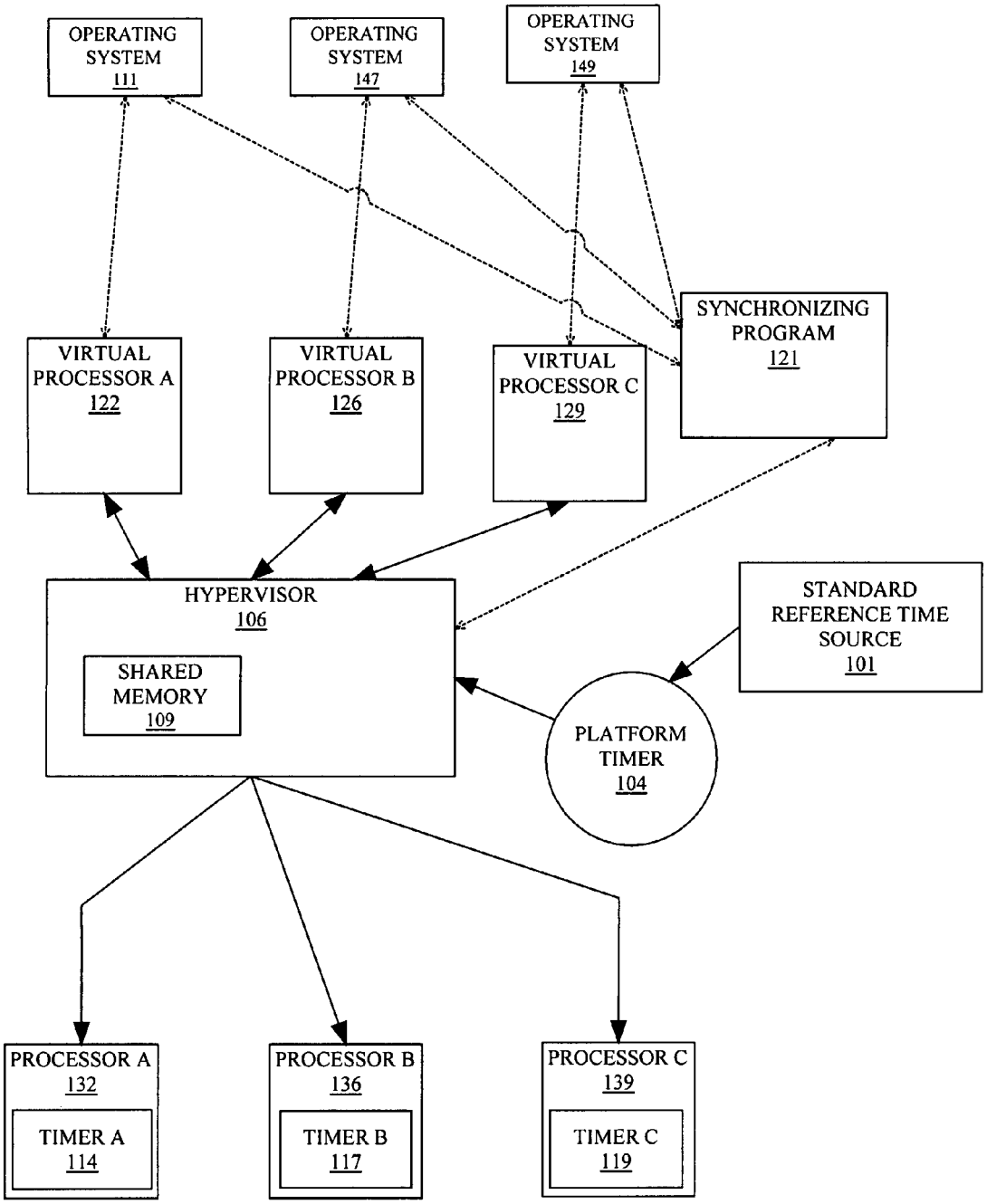
FIG. 1B is an illustration of an exemplary multiprocessor system within which a synchronizing program may be implemented.

In a preferred embodiment, hypervisor 106 is a virtualization platform communicatively coupled with various hardware components of computing system 100 and software programs, such as GOS 111. Hypervisor 106, controls the communication between GOS 111 and CPU 132, thereby allowing GOS 111 to run on CPU 132. Sometimes referred to as a virtualization manager (VMM), hypervisor 106 controls access to CPU 132 on computer system 100 and therefore controls the execution of GOS 111 which further instructs for the execution of applications on CPU 132. In an alternatively preferred embodiment, a computing system 100 may be implemented wherein hypervisor 106 may be communicatively coupled with multiple CPUs and/or multiple GOSs. In such a multiprocessor environment as shown in FIG. 1B, the hypervisor 106 is in communication with CPUs (132, 136, and 139) and GOSs (111, 147, and 149) allocating the resources of the CPUs (132, 136, and 139) between and amongst the one or more GOSs (111, 147, and 149). Thus, the hypervisor 106 may allow multiple GOSs (111, 147, and 149) to share a single CPU 132 or may direct that the execution of the various executable commands within the instruction set of a single GOS 111 be performed upon two or more of the CPUs (132, 136, and/or 139). Still further alternative execution environments may be established by the hypervisor 106 as may be contemplated by those skilled in the art.

In order to control access by the GOSs to the CPUs the hypervisor 106 provides a representation of a CPU (referred to herein as a "virtual CPU" (VCPU) or "virtual processor") (122, 126 or 129) that gives the appearance to a GOS, such as GOS 111 or others, that it is accessing a CPU, such as CPU 132, 136, or 139, memory, and other resources available with a computing system. The VCPU representation provided to the GOS may be that the GOS has exclusive access to the CPU or be capable of providing various other operating parameters required by a GOS. In a preferred embodiment, shown in FIG.

1B, the hypervisor 106 creates multiple VCPUs (122, 126 or 129) and allocates their resources to the multiple GOS (111, 147, and 149) as needed. It is to be understood, that there may be different operating systems such as 111, 147, and 149 shown in FIG. 1B, or multiple instances (applications) of the same operating system. It is further understood that the types and number of additional "applications" (software programs) that are being supported by the GOS(s) may vary without departing from the scope and spirit of the present invention.

In the current embodiment, the platform timer 104 is a combination of a stand alone oscillator and counter. It is contemplated that platform timer 104 is similar to the local timer 114, the oscillator may provide "ticks" at a certain frequency and the counter may provide a counter value time record. As will be described below, the platform timer 104 provides a platform time value that is used in the synchronization of time. It is further contemplated that the platform timer 104 may consist of a "source" for a counter value that may be used for tracking time. In an alternative embodiment, a platform timer may be a local timer, such as local timer 114, which has been designated as a platform timer for synchronizing time.

In the current embodiment, system 100 includes a source for a standard reference time 101. The source for standard reference time 101 may include any of a number of sources, such as a network, a URL, a battery operated clock or any other source contemplated by one skilled in the art. In a preferred embodiment, the standard reference time 101 is taken from a Universal Time Constant (UTC) value/time source. However, other time reference may be utilized by the present invention.

Figure 2:
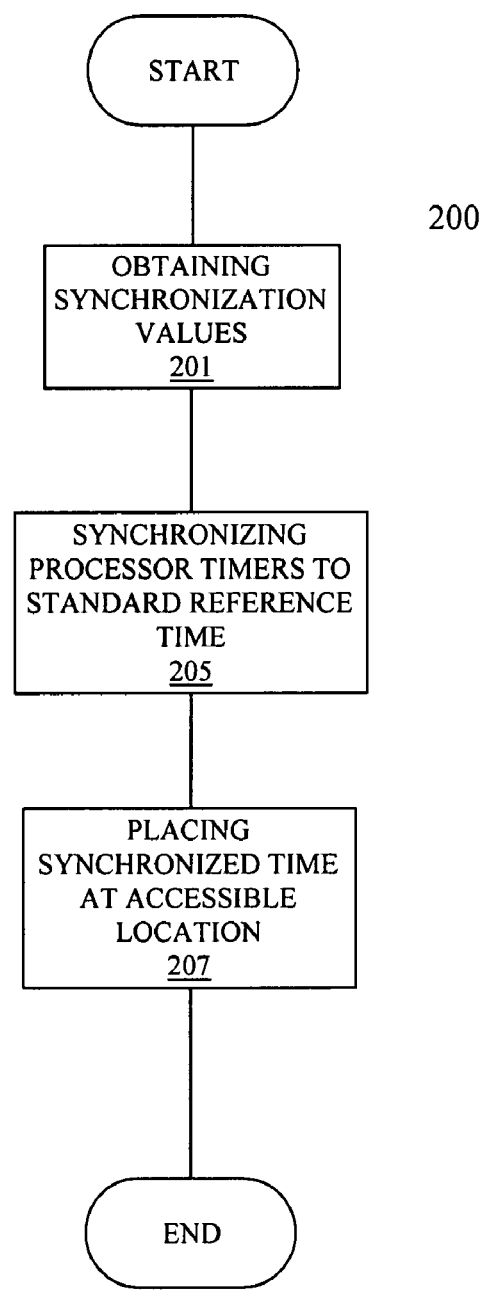
FIG. 2 is a block diagram representation illustrating a general method of synchronizing local timers on multiple processors to a shared time value in accordance with an exemplary embodiment of the present invention.

As described above, synchronizing program (SP) 121 is a computer readable set of instructions providing commands to be executed upon/by a computing system, typically by the CPU of the computing system. In a preferred embodiment, SP 121 provides instructions for providing a synchronized time value by the synchronization of a processor timer's time value, such as local timer 114, with an extrapolated reference time from a platform timer, such as platform timer 104. The set of instructions implements a method 200, shown in FIG. 2, for synchronizing the processor timer without having to obtain the time from the platform timer. It is contemplated that a time value from the platform timer may be obtained to determine a first synchronized time value, but after that initial determination SP 121 may allow for synchronizing time values without having to reference the platform timer value again. In the current embodiment, SP 121 accomplishes its determination of a synchronized time value by directing the hypervisor 106 in a first step 201 to obtain/calculate a set of synchronization values and place the synchronization values into a shared memory 109. Thus, a time record for the CPU is created and stored at a designated location within the computing system. The designated location may be various components of a computing system, but will be accessible to certain other components of the system which require the information stored within. The time record may then be utilized by the guest operating system 111 for determining a synchronized time value in step 205 and then placing that synchronized time value in a storage location within the computing system in step 207. It is contemplated that each processor may have its own individual time record being stored in a location within the computing system. Further, it is contemplated that the "storage location" of the various values may be in a geographically remote location from the computing system and accessed through one or more various communication pathways. Thus, the current invention may implement its method in combination with the use of various components networked together.

In the preferred embodiment of the present invention, the synchronizing program 121 provides instructions for a method of synchronizing processor timers. As stated above, the method for synchronizing time 200 is described in FIG. 2. In a first step 201, synchronization values are obtained and stored. The storage of these synchronization values may be referred to herein as a "time record". The synchronization values include a processor timer counter value ($l_k$), a synchronization local timer time value ($u_k^l$), a calibration constant ($C_k$), and a current processor timer counter value (l). It is contemplated that these synchronization values may be placed at other accessible locations such as in a time record upon the virtual processor, shared memory, virtual memory, shared hard drive, virtual hard drive, cd rom, virtual cd rom, or any other location from which the information may be retrieved locally (i.e., within the computing system) or remotely, such as over a network. In a second step 205, the synchronization values obtained in the first step 201, are utilized to synchronize a local timer to a standard reference time. In the current embodiment, the standard reference time is a UTC time value. Alternatively, the standard reference time may vary as previously described. The result of this second step 205 is to provide a synchronized time value ($u^l$). In a final step 207, the synchronized time is placed at an accessible location, for access by the various components the computing system, such as the GOS, hypervisor, and/or CPU. In a preferred embodiment, the synchronized time ($u^l$) is placed in the time record as described above. Alternatively, the synchronized time may be placed in a location separate from the other synchronization values but still accessible by the components that require its information. In a preferred embodiment, the synchronized time ($u^l$) overwrites the synchronization local timer time value ($u_k^l$) in the time record and is utilized in later synchronization calculations. Alternatively, the synchronized local timer time value may simply be removed from the time record upon the calculation and storage of the synchronized time value ($u^l$). It is also contemplated, that the synchronized time ($u^l$) may be placed at a geographically remote location where it may be accessed for future calculations.

In one embodiment of the present invention, the guest operating system utilizes the synchronization values to calculate the synchronized time value ($u^l$) of the processor that is assigned to it by the hypervisor. In calculating the synchronized time, the GOS executes the following algorithm:

$$u^l = u_k^l + (l - l_k) * C_k$$

As explained previously, the synchronization values from the first step 201 are stored in an accessible location, such as the shared memory, and may be accessed by the GOS during execution. The synchronization values may include three terms: 1) $C_k$ which is a determined frequency factor (calibration constant) at the start of the epoch k, this term is typically calculated by the hypervisor, as explained below and shown in FIG. 4; 2) $l_k$ which is the local timer counter value l as read at the start of epoch k; and 3) $u_k^l$, the estimate of the current time as read at the start of epoch k and defined by (extrapolated from) the local timer counter value l. The l value is the current local timer value, as previously mentioned, and is obtained from the local timer counter. Thus, the $u^l$ or synchronized time value as a function of the local timer value is determined by the execution of the above algorithm by the GOS.

Figure 3:
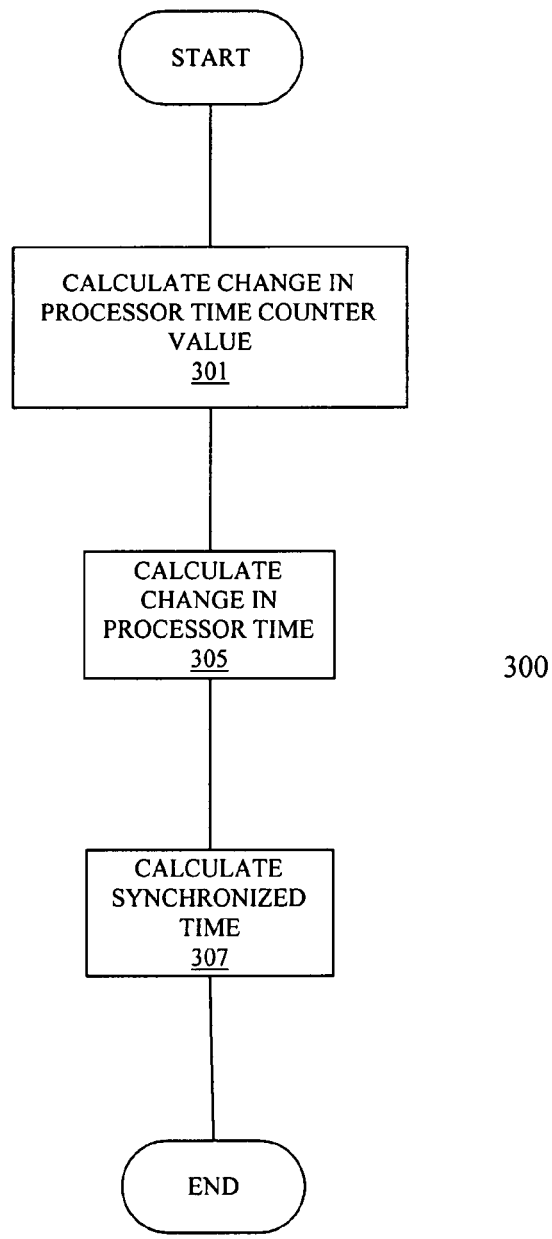
FIG. 3 is a block diagram representation illustrating a method for obtaining a synchronized local processor time in accordance with an exemplary embodiment of the present invention.

As a result, the method for calculating the synchronized time is calculated in a number of steps. The method 300, shown in FIG. 3, illustrates these steps. In a first step 301 the change in the local time counter value (l-$l_k$) is calculated. A second step 305 determines the change in local time calculated by the change in the local time counter value multiplied by the calibration constant. In the final step 307, the change in the local time is added to the synchronized time value ($u^l$), which has been stored at an accessible location. The result of the final step 307 is the synchronized time for the local timer of a particular processor/CPU.

In a preferred embodiment of the present invention, when the computing system executing the synchronizing program 121 is started, an initial set of values may be calculated in a number of ways. In one exemplary initialization, initial local timer value ($u_k^l$) corresponds to a time reference value that may be obtained from a local battery operated clock for that processor, a battery operated clock for the system, a network source for the time reference, or other sources that maintain local time when the computer system is not operating. The calibration constant $C_k$ is equal to the calibration factor as described below. In order to conduct the calculations, the local timer counter is read once upon start up to provide $l_k$ and a few moments later to provide l. In the next step, the change in the local timer counter value (l-$l_k$) is calculated. The change in the local timer counter value is then multiplied by the calibration factor to determine the change in the processor time. Finally, the change in the processor time is added to the initial local timer value ($u_k^l$). The result is the initial synchronized time for the local timer of the particular processor. That value is placed at an accessible location such as shared memory. Once this first step is conducted, the process may continue indefinitely until the computer no longer operates. From that point forward, the time record may be updated with the calculated synchronized time, the updated calibration constant, and the local timer counter value as they are calculated or recorded.

In a preferred embodiment, the calibration constant $C_k$, described above, is calculated by the hypervisor. Alternatively, the calibration constant may be determined by various components of a computing system as may be contemplated by those skilled in the art. This calibration constant $C_k$ is a frequency-scale factor for a local timer. CPU's independently execute a synchronization algorithm to maintain a running time (wall-clock time). The calibration constant $C_k$ is derived from an algorithm that proceeds in epochs, that is defined and static periods of time measured by an oscillator (frequency). Each epoch n is expected to last e standard reference time (e.g., UTC) ticks (e.g., one second). It is to be understood that the epoch for each CPU may last a different amount of time, but it is a defined and generally static period that is measured by an oscillator mechanism. Therefore, it may be that the frequency of the oscillators may vary between timers of different CPUs, but generally the oscillation is a stable frequency. For instance, one timer may have an oscillator frequency of 4 cycles per epoch while another timer may have an oscillator frequency of 2 cycles per epoch.

It is to be understood that this command may be executed on one or more processors at any given time. In the second command of the program, the determination of the frequency or calibration constant of the local timers is calculated at the start of each epoch and is accomplished through use of the following algorithm:

$$C_n = \frac{u_n^p - u_{n-1}^p}{l_n - l_{n-1}} \times \frac{e}{e + u_n^l - u_n^p}$$

The first term or calibration factor of the above product represents the relative frequencies of the standard reference time, e.g., UTC, and the local timer during the previous epoch. Thus, the calibration factor may be described as a frequency value. The second term is an error-correcting factor that allows for the counter-balancing of the absolute error $u^l - u^p$ in locally-estimated standard reference time, UTC, by the start of the next epoch (when the locally-extrapolated time increases by e, the standard reference time or UTC will have increased by $e + u_n^l - u_n^p$ and balanced the error). To avoid time traveling backwards, $C_n$ is preferably clamped to $\geq 0$. Further, $u_n^l \geq u_n^p$ may be clamped by warping local time forward if it lags behind platform time: thus, the error-correcting factor corrects a local clock that has run too fast, since time may not be warped backwards. Alternative time values which may result in various different calibration factor calculations may be used as contemplated by those of ordinary skill in the art.

Figure 4:
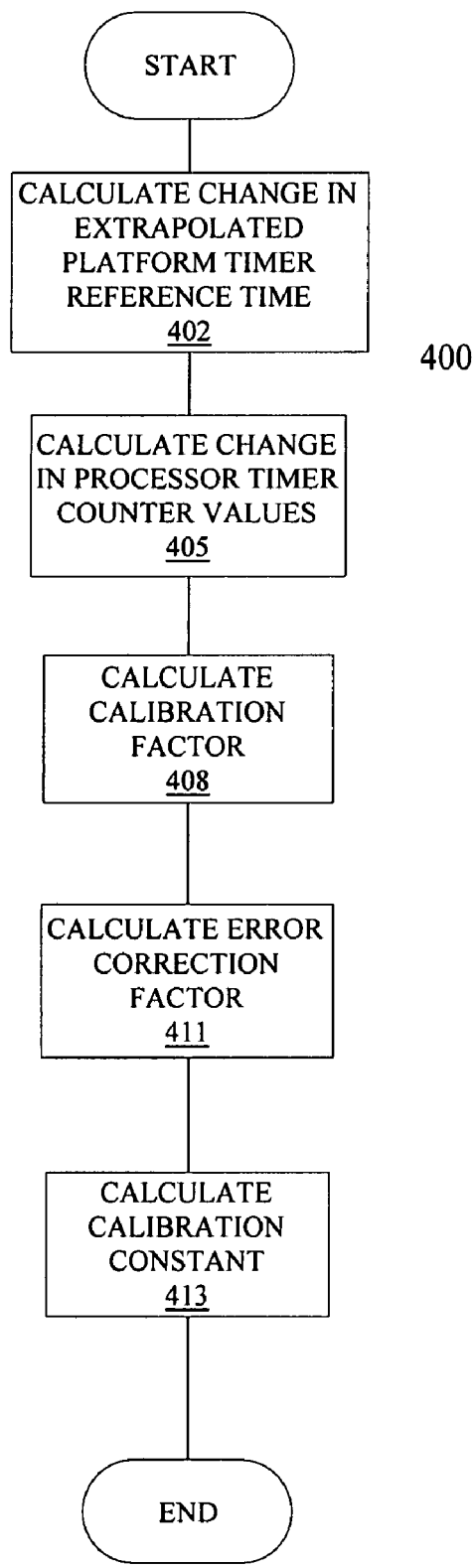
FIG. 4 is a block diagram representation illustrating the steps taken by a hypervisor to calculate a calibration constant in accordance with an exemplary embodiment of the present invention.

As describe in FIG. 4, the calibration constant 400 may be calculated in the following way. The first step 402 in the process provides for calculating the change in extrapolated platform timer reference time ($u_n^p - u_{n-1}^p$) and the change in the local timer counter values ($l_n - l_{n-1}$) 405. The next step 408 comprises calculating a calibration factor equal to the ratio of the change in extrapolated platform timer reference time and the change of local timer counter values (($u_n^p - u_{n-1}^p$)/($l_n - l_{n-1}$)). In step 411, the algorithm next comprises the calculation of an error correction factor (e/(e+$u_n^l - u_n^p$)). Finally, in step 413, the calibration constant is calculated by multiplying the correction factor by the error correction factor. The calibration constant is also communicated and stored within an accessible location, such as the shared memory, and may be updated at any time. With this frequency value stored in the shared memory a third algorithm is executed.

Figure 5:
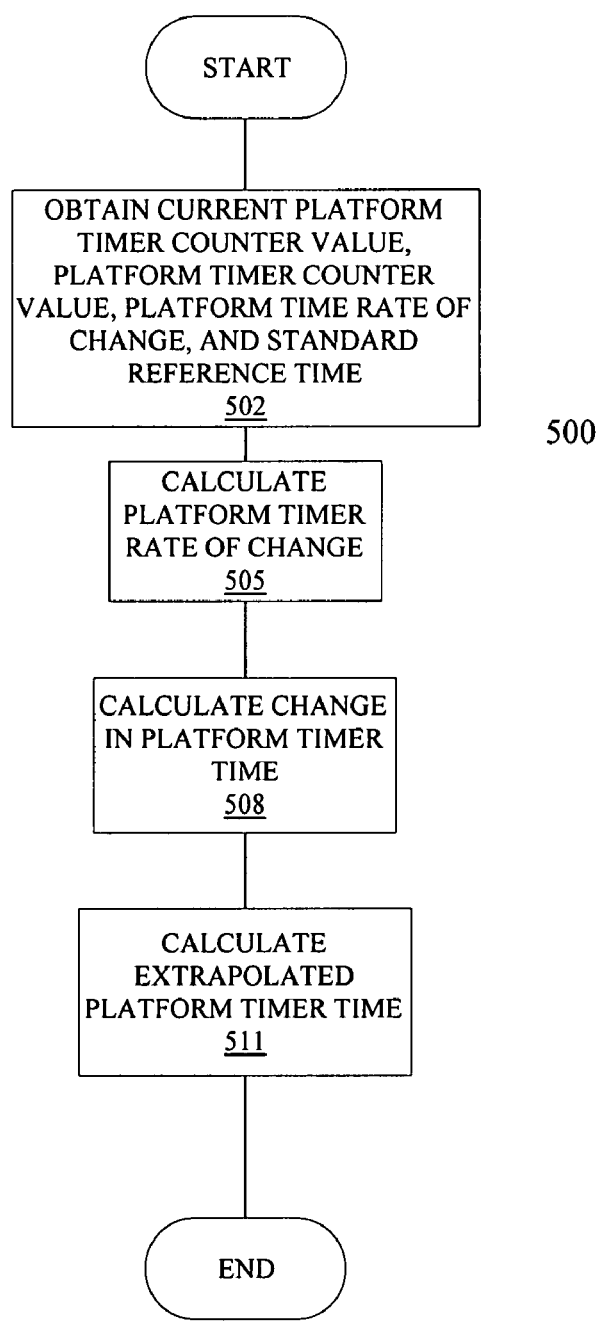
FIG. 5 is a block diagram representation illustrating the steps taken by a hypervisor to extrapolate a standard reference time from a platform timer in accordance with an exemplary embodiment of the present invention.

In a preferred embodiment, the calibration constant calculation includes an extrapolated platform timer reference time $u^p$. The calculation of the extrapolated platform timer reference time may occur as described in method 500 and shown in FIG. 5. In the current embodiment, the hypervisor performs this calculation. Alternatively, various components of a computing system may perform this calculation. The method 500 for calculating the platform reference time may includes a first step 502 where the hypervisor obtains a current platform timer counter value (p), a synchronization platform timer counter value at a time k ($p_k$), a platform timer rate of change (du/dp), and a standard reference time value ($u_k^p$). In the next step 505 the change in platform counter values is calculated, which is the difference between the current platform timer counter value and the platform timer counter value at a previous time k (p-$p_k$). The rate of change of the platform timer counter (du/dp) is then utilized to calculate the change in platform timer reference time in step 507. The rate of change du/dp may be a standard known value for the particular platform timer. It is also contemplated that the rate of change du/dp may be obtained from a list of platform timer counter values. The du/dp value is a normalizing factor calibrated during system boot and tuned thereafter by an NTP daemon. This daemon updates its estimate of platform (or local) timer frequency via a system call (adjtime) which is hooked by the hypervisor to adjust du/dp rather than directly adjusting the guest operating system's calibration factor. The change in platform timer reference time, (p-$p_k$)*du/dp, is calculated by multiplying the difference between the current platform timer counter value and the platform timer counter value at a previous time k by the rate of change of the platform timer counter. The hypervisor, in a last step 513, obtains the platform timer standard reference value at time k from the platform timer's time record and calculates the extrapolated platform timer reference time by adding the change in platform timer reference time to the platform timer reference time at time k.

Thus, the synchronizing program 121 also provides an executable command that allows the calculation of an extrapolated platform timer time to be used in the synchronizing process. As described previously, let p be the current platform timer value, l be the local CPU timer counter value, $u^p$ be standard reference time, e.g., UTC, extrapolated from the platform timer, $u^l$ be standard reference time, e.g., UTC, extrapolated from the local timer, $-_n$ be a timestamp of some time value at the start of an epoch n, and k be the current epoch. Thus, the algorithm corresponding to the extrapolation of the platform timer standard time is reduced to:

$$u^p = u_k^p + (p - p_k) * du/dp$$

This command is executed by and allows the hypervisor to extrapolate the current standard reference time, e.g., UTC time, from the platform timer. As previously mentioned, the hypervisor has access to the shared memory and places the extrapolated platform timer reference value into a specific location designated within the shared memory. The extrapolated platform timer reference value within this designated shared memory location may be updated by the hypervisor at any time along with incrementing an associated platform timer counter. By reading the platform timer counter before and after reading the standard reference value, a GOS can assure itself of a consistent interpretation providing that the version counter values are identical; otherwise the GOS simply retries.

In the preferred embodiment described above, synchronizing program 121 includes a set of executable commands, such as the algorithms described above, that allow for the synchronization of the local timer of a CPU with a standard reference time, such as UTC. The standard reference time value may be obtained from any of a number of sources, such as a network, a browser or any other source contemplated by one skilled in the art. The standard reference time or UTC from the source is utilized to synchronize the platform timer, which communicates with the virtual environment's hypervisor. It is to be understood that the synchronization algorithm(s) may be executed by all CPUs in a multiprocessor system independently. It may be assumed that the machine-local oscillators have stable frequency and that the timers may be consulted accurately and with insignificant latency.

Thus, the synchronizing program 121 of the current invention allows the guest operating systems to obtain the current standard reference time, e.g., UTC, based on its calibration to the local timer by reading the local timer counter, but without having to directly read the local time from the CPU. The local time of a CPU may be an extrapolated time based on a reference time value obtained from a source (e.g., platform timer). In a preferred embodiment, the GOS receives all the needed information from the hypervisor through the shared memory. The hypervisor executes the algorithm(s) for each CPU (local timer) and in combination with the standard reference time, e.g., UTC, extrapolated from the platform timer provides the necessary information about each local timer to the shared memory for the GOS. The GOS may utilize these values to determine a synchronized time value and, therefore, be allowed to operate/execute upon one or more CPUs.

It is further contemplated by use of the current invention that the GOS is capable of "moving" between multiple CPUs which may occur in two manners. One is "migration", which is the ability of the GOS to update to UTC, as described above, while executing upon different virtual CPUs. The second is "relocation", which is the ability of the GOS to update to UTC, as described above, while executing upon different physical CPUs. Because the synchronizing program accounts for the different frequencies of multiple CPUs the GOS may move between and operate on each of these multiple CPUs. Further, this allows the GOS to operate upon various types of CPUs as may be contemplated by those of ordinary skill in the art.

The hypervisor communicates with and executes its functions based off information it receives from the platform timer. Thus, the GOS is updated from the shared memory and may avoid communicating with the platform timer. This may avoid the GOS having to spend processing time communicating with the platform timer in order to extrapolate the local time. Further, this may allow the hardware to not become increasingly bound to the virtual machine in order to maintain a current and updated local time for use by the GOS. The hardware may execute the local timer and it is the hypervisor that takes that value and calibrates it with the UTC in order to provide a "local time" to the GOS. In a preferred embodiment, the execution of the algorithms is performed by the hypervisor and GOS, not the local hardware and this may further promote the decrease in processing time and power requirements. The execution of the algorithm(s) of the current invention may be performed by various components of a computing system as may be contemplated by those skilled in the art.

This environment may be configured as a single computing system with two or more processors or a multiple computing systems environment each having independent processors. It is to be understood that the platform timer may be communicatively coupled with the processors directly or through a network.

Figure 6:
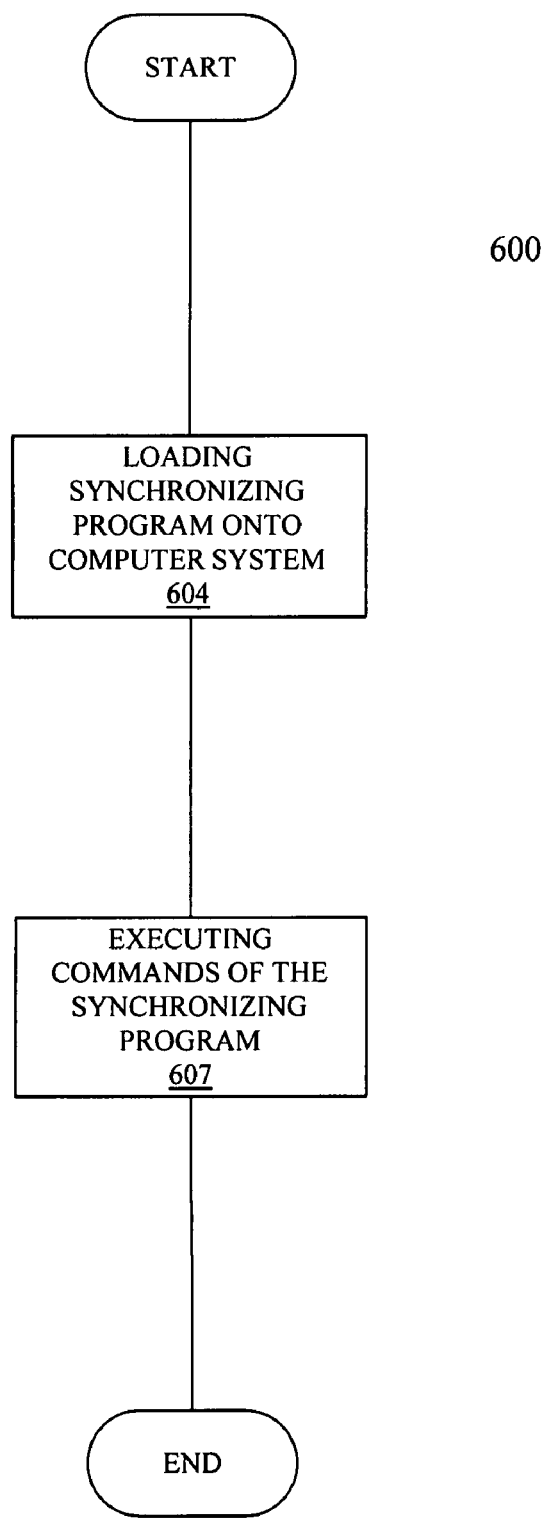
FIG. 6 is a block diagram representation illustrating a method for synchronizing computer timers in accordance with an exemplary embodiment of the present invention.

In another preferred embodiment, a method 600 of synchronizing the local timers of multiple CPUs with the Universal Time Constant (UTC) is shown in FIG. 6. In this method a first step 604 includes loading a synchronizing program, such as SP 121 of the current invention, onto a computer system having multiple processors. The synchronizing program may be loaded as software, programmed into hardware, or made available for execution by the CPU through various other mechanisms as contemplated by those of ordinary skill in the art. In a second step 607 the processors execute the synchronizing program instruction set wherein the hypervisor extrapolates UTC from the platform timer, the frequency of the local timer is determined and calibrated to UTC, and the OS executes a synchronization algorithm to synchronize the local timers to UTC.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for synchronizing timers on multiple hypervisor controlled processors to a standard reference time, the method comprising:
   obtaining, by a synchronization program executing on a computing system comprising a processor communicating with a guest operating system via a hypervisor, synchronization values,
   wherein the computing system comprises a platform timer communicatively coupled to the hypervisor and the processor comprises a timer;
   calculating, by the hypervisor, a calibration constant using a relative frequency of a standard reference time, a relative frequency of the processor timer, and an error correction factor;
   calculating a synchronized time value calibrated using the calibration constant; and
   storing the synchronized time value in an accessible location.

2. The method of claim 1, further comprising calculating the error correction factor by counter-balancing an absolute error of the standard reference time.

3. The method of claim 1, further comprising calculating the standard reference time using an extrapolated reference time of the platform timer.

4. The method of claim 1, further comprising synchronizing the guest operating system with the synchronized time value.

5. The method of claim 1, wherein obtaining synchronization values further comprises:
   obtaining the relative frequency of the standard reference time;
   obtaining the relative frequency of the processor timer; and
   obtaining the error correction factor.

6. The method of claim 1, wherein calculating the synchronized time value further comprises calculating, by the guest operating system, the synchronized time value.

7. The method of claim 1, further comprising assigning the guest operating system to the processor.

8. The method of claim 7, further comprising synchronizing the guest operating system with the synchronized time value after the guest operating system is assigned to the processor.

9. The method of claim 1, wherein storing the synchronized time value further comprises storing the synchronized time value in an accessible location comprising one of a shared memory, a virtual memory, a shared hard drive, a virtual hard drive, a cd-rom, and a virtual cd-rom.

10. The method of claim 1, wherein the guest operating system may be reassigned to different processors.

11. A system for synchronizing timers on multiple hypervisor controlled processors to a standard reference time, the system comprising:
    a processor comprising a timer, the processor communicating with a guest operating system via a hypervisor;
    a platform timer communicatively coupled to the hypervisor;
    a computing system comprising the processor and the platform timer;
    the hypervisor calculating a calibration constant using a relative frequency of a standard reference time, a relative frequency of the processor timer, and an error correction factor; and
    a synchronization program executing on the computing system to:
      obtain synchronization values,
      calculate a synchronized time value using the calibration constant, and
      store the synchronized time value in an accessible location.

12. The system of claim 11, wherein the hypervisor calculates the error correction factor by counter-balancing an absolute error of the standard reference time.

13. The system of claim 11, wherein the hypervisor calculates the standard reference time using an extrapolated reference time of the platform timer.

14. The system of claim 11, wherein the guest operating system synchronizes with the synchronized time value.

15. The system of claim 11, wherein the synchronization program obtains synchronization values by:
    obtaining the relative frequency of the standard reference time;
    obtaining the relative frequency of the processor timer; and
    obtaining the error correction factor.

16. The system of claim 11, wherein the hypervisor assigns the guest operating system to the processor.

17. The system of claim 16, wherein the hypervisor synchronizes the guest operating system with the synchronized time value after assigning the guest operating system to the processor.

18. The system of claim 11, wherein the accessible location comprises one of a shared memory, a virtual memory, a shared hard drive, a virtual hard drive, a cd-rom, and a virtual cd-rom.

19. The system of claim 11, wherein the guest operating system may be reassigned to different processors.

* * * * *